(12) United States Patent
Mazaki (10) Patent No.: US 8,259,339 B2
(45) Date of Patent: Sep. 4, 2012

(54) IMAGE FORMING APPARATUS

(75) Inventor: Takeshi Mazaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1130 days.

(21) Appl. No.: 11/902,415

(22) Filed: Sep. 21, 2007

(65) Prior Publication Data

US 2008/0094662 A1 Apr. 24, 2008

(30) Foreign Application Priority Data

Oct. 23, 2006 (JP) ................. 2006-288053

(51) Int. Cl.
*G06K 15/00* (2006.01)
*G06F 3/12* (2006.01)
*G06F 12/00* (2006.01)
*G06F 9/26* (2006.01)
*G06F 9/34* (2006.01)
*G06F 12/06* (2006.01)
*G06F 9/00* (2006.01)
*G06F 15/177* (2006.01)

(52) U.S. Cl. ............ 358/1.16; 358/1.13; 358/1.17; 358/1.15; 711/1; 711/2; 711/5; 711/100; 711/202; 711/209; 711/220; 713/1; 713/2

(58) Field of Classification Search ............ 358/1.16, 358/1.17, 1.13; 713/1, 2
See application file for complete search history.

(56) References Cited

U.S. PATENT DOCUMENTS 5,987,581 A * 11/1999 Nale .................. 711/202
2002/0099920 A1* 7/2002 Shoji ................. 711/170
2004/0075858 A1* 4/2004 Namizuka .............. 358/1.13
2006/0149954 A1* 7/2006 Hageman et al. ........... 713/1

FOREIGN PATENT DOCUMENTS

JP 2000-0207276 7/2000

* cited by examiner

*Primary Examiner* — King Poon
*Assistant Examiner* — Vincent Peren
(74) *Attorney, Agent, or Firm* — Harness, Dickey & Pierce, P.L.C.

(57) ABSTRACT

An image forming apparatus includes a memory that stores therein a control program, a central processing unit that executes the control program stored in the memory, a print engine controlled by the central processing unit, and a unit that is selected from a plurality of units. An identification signal generating unit generates identification data indicating a type of the unit. An exclusive OR unit allocates an exclusive OR data of an address data for the central processing unit to access the memory and the identification data to the memory.

11 Claims, 6 Drawing Sheets

IMAGE FORMING APPARATUS

CROSS-REFERENCE TO RELATED APPLICATIONS

The present application claims priority to and incorporates by reference the entire contents of Japanese priority document, 2006-288053 filed in Japan on Oct. 23, 2006.

BACKGROUND OF THE INVENTION

1. Field of the Invention

The present invention relates to an image forming apparatus that performs data processing and print control in response to a print command based on a control program stored in a memory, and more particularly, to an image forming apparatus that stores a multi-system control program in a memory, and performs data processing and print control based on the control program of the system corresponding to the type of the unit that the image forming apparatus comes equipped with. The present invention can be implemented on a printer, a multifunction product (MFP), and a facsimile.

2. Description of the Related Art

It is very common to store programs, for the purpose of updation or for convenience, in a flash read-only memory (ROM) provided in image forming apparatuses. Storing the programs in the flash ROM eliminates the need for analyzing the product when updating the programs, and allows the user to download programs or data from any commonly used memory such as a integrated circuit (IC) card via an external device interface (I/F). When an IC card is detected via the external device I/F, the program on the IC card is read by substituting the flash ROM address with that of the IC card on the memory map and downloading the data on the IC card to the flash ROM. The address substitution is implemented by decoding the address signal output by a central processing unit (CPU), and generating a chip selection signal for the IC card to the accessing device. From the viewpoint of circuit pattern and cost, it is most efficient to provide an address decoder in the form of a CPU peripheral application-specific integrated circuit (ASIC). Development rate can be improved if a common ASIC can be used by several models. In the case where the substrate itself upon which the ASIC is mounted is shared by a plurality of models, different models will require different devices or capacities. A device is proposed in Japanese Patent Application Laid-open No. 2000-207276 that absorbs these differences in the requirements of devices and capacities. The device causes the address decoding to be flexibly altered by register setup, and based on a hardware detection signal that indicates that a capacity suitable for the device be allocated, changes the size of the address space corresponding to each chip selection signal.

However, in recent years, model development has come to be implemented by kitting sales where the functionalities of a product in the market can be expanded by providing optional functions and additional functions, or the functionalities of a product, which is manufactured in a low-cost low functionality form and a high-cost high functionality form, can be enhanced by adding functionalities at the site (service station, etc.). However, the program corresponding to the additional functions should be downloaded and kept ready in advance. Often, depending on the status of model development, only programs for low-cost low functionality model types are available. Many a time, depending on the additional functionality, software development for low functionality model and high functionality model are carried out independently to improve development rate, making it difficult to provide a single comprehensive program in the period allocated for development. Further it is difficult to accurately estimate the volume of the program for low functionality and high functionality at the beginning of development. Therefore, the volumes allocated during hardware selection are on the higher side.

Thus, although it is effective to perform address decoding and flexibly vary the memory capacity according to the chip selection signal, the ROM capacity that is appropriate for the program volume must be set appropriately, according to the volume distribution set for low functionality program and high functionality program and development schedule. In the conventional method, different programs have to be provided in different devices, necessitating a larger substrate, resulting in increased cost. Further, in a conventional method, if there is free space in the address area accessed by the CPU, the shortfall ROM area can be allocated to the free space. However, although it is possible to increase the ROM area evenly under certain conditions such as bank switching, it is not preferable to have equal distribution of ROM area between low functionality program and high functionality program.

SUMMARY OF THE INVENTION

It is an object of the present invention to at least partially solve the problems in the conventional technology.

An image forming apparatus according to one aspect of the present invention includes a memory that stores therein a control program, a central processing unit that executes the control program stored in the memory, a print engine controlled by the central processing unit, and a unit that is selected from a plurality of units. The image forming apparatus includes an identification signal generating unit that generates identification data indicating a type of the unit, and an exclusive OR unit that allocates an exclusive OR data of an address data for the central processing unit to access the memory and the identification data to the memory.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
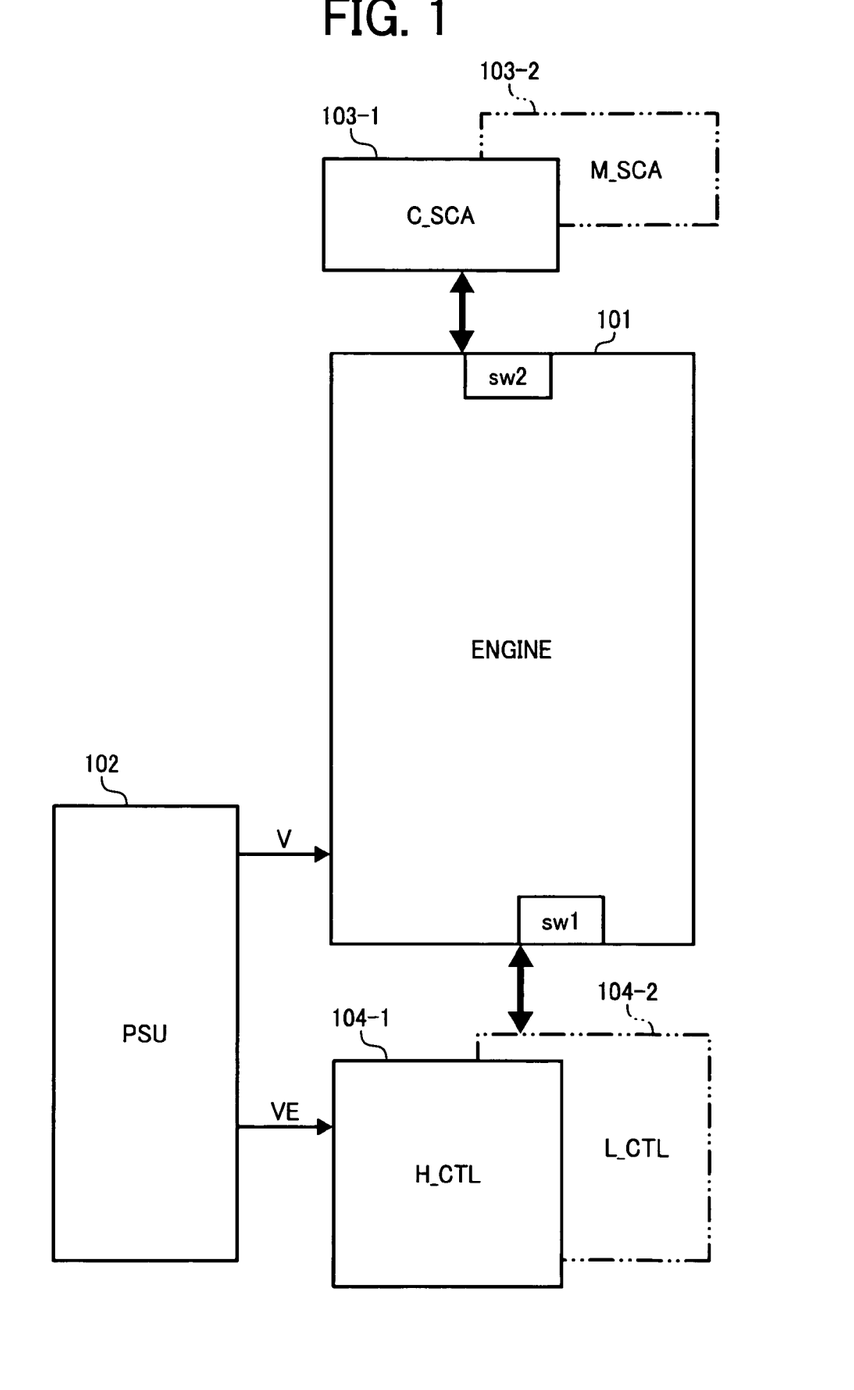
FIG. 1 is a block diagram of a copying machine according to a first embodiment of the present invention.

FIG. 1 is a schematic of a first embodiment of the present invention. The first embodiment is a multifunction product (MFP). An engine 101, which is a main unit of a printer, includes a print engine and a process controller. Depending on the model, when a low functionality system controller (L_CTL) 104-2 is connected to the engine 101, the low functionality system controller 104-2 controls the reception and execution of a print command, causes the engine 101 takes charge of most of the image data processing functions and print control functions, and causes the engine 101 to actuate these functions. On the other hand, when a high functionality system controller (H_CTL) 104-1 is connected to the engine, the high functionality system controller 104-1 controls reception and execution of a print command as well as controlling high functionality image data processing such original image reading, storing, transferring, receiving and sending facsimile and print control function. The control implemented by the engine 101 will differ based on which system controller is connected to it. In other words, the engine 101 executes a different control program depending on whether the low functionality system controller 104-2 is connected or the high functionality system controller 104-1 is connected.

Similarly, the process control of the engine 101 will differ significantly depending on whether a color scanner 103-1 is provided as a scanner unit or a monochrome scanner 103-2 is provided. In other words, the control programs executed by the engine 101 in the two cases are different.

The engine includes a controller type determining switch sw1 attached to a connector and a scanner type determining switch sw2 also attached to a connector. The controller type determining switch sw1 generates a one-bit signal serving as a controller identification data that indicates which system controller (104-1 or 104-2) is connected to the engine 101. Similarly, the scanner type determining switch sw1 generates a one-bit signal serving as a scanner identification data that indicates which scanner (103-1 or 103-2) is connected to the engine 101.

Figure 2:
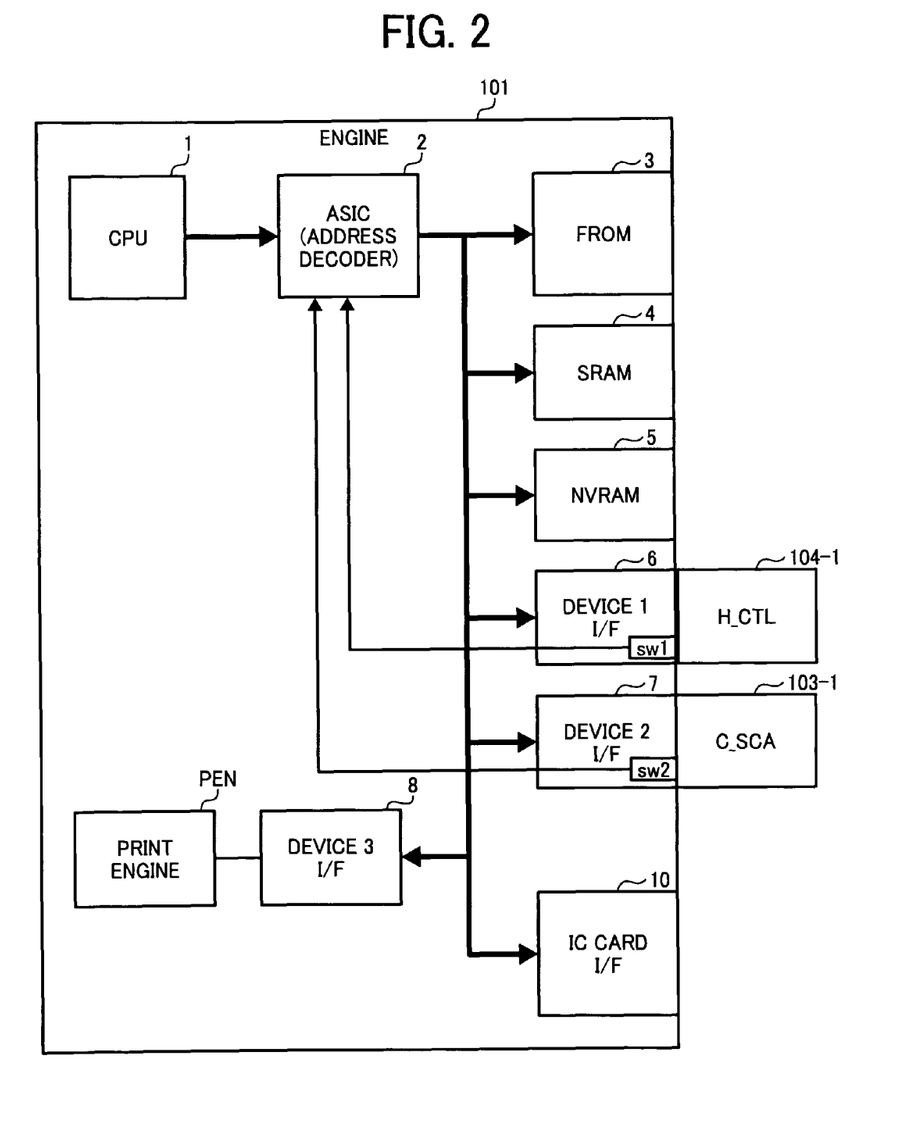
FIG. 2 is a block diagram of an engine, which is a main unit of a printer.

FIG. 2 is a drawing of circuit components in the engine 101 mainly relevant to data reading and writing. In the first embodiment, the engine 101 includes a print engine PEN of elecrophotographic type that scans a charged surface of a photosensitive member with a light beam modulated by an image data, forming thereon an electrostatic latent image, develops the electrostatic latent image with a toner to form a toner image, and transfers the toner image on a paper sheet. A main CPU 1 controls the imaging action of the print engine PEN via a device interface (I/F) 8 according to a control program stored in a flash ROM (FROM) 3. The engine 101 also includes an ASIC 2, a static RAM (SRAM) 4, a nonvolatile RAM (NVRAM) 5, a device I/F 6 that connects to the system controller 104, a device I/F 7 that connects to the scanner 103, and an IC card I/F 10. The CPU 1 uses the SRAM 4 as the work memory to control the various parts of the copier and performs copying or printing output from a personal computer (PC) based on the program in the FROM 3.

The high-cost high functionality system controller (H_CTL) shown in FIG. 1 includes an operation panel I/F, a network I/F, a facsimile control unit (FCU), an HDD I/F, and an extension slot, apart from the CPU, the FROM, the SRAM, the NVRAM, and controls copying, original image reading, storage of printed data, editing, management of stored data, utilization management of the copier, printing of stored data, transfer of printed data between PCs, printing of output from the PC, etc. The low-cost low functionality system controller (L_CTL) 104_2 includes the operation panel I/F and the network I/F, apart from the CPU, the FROM, the SRAM, and the NVRAM, and controls copying and printing of output fro the PC.

The controller type determining switch sw1 is attached to the connector at the device I/F 6 end that receives the system controller 104. The controller type determining switch sw1 is switched on by the connector (that is, becomes active or has a high output level of "1") if the connector at the high functionality system controller 104-1 end is connected. If the connector at the low functionality system controller 104-2 end is connected, the controller type determining switch sw1 is not turned on by the connector and remains switched off (that is, remains non-active or has a low output level of "0").

The scanner type determining switch sw2 is attached to the connector at the device I/F 7 end that receives the scanner 103. The scanner type determining switch sw2 is switched on by the connector (that is, becomes active or has a high output level of "1") if the connector at the color scanner 103-1 end is connected. If the connector at the monochrome scanner 103-2 end is connected, the scanner type determining switch sw2 is not turned on by the connector and remains switched off (that is, remains non-active or has a low output level of "0").

Figure 3:
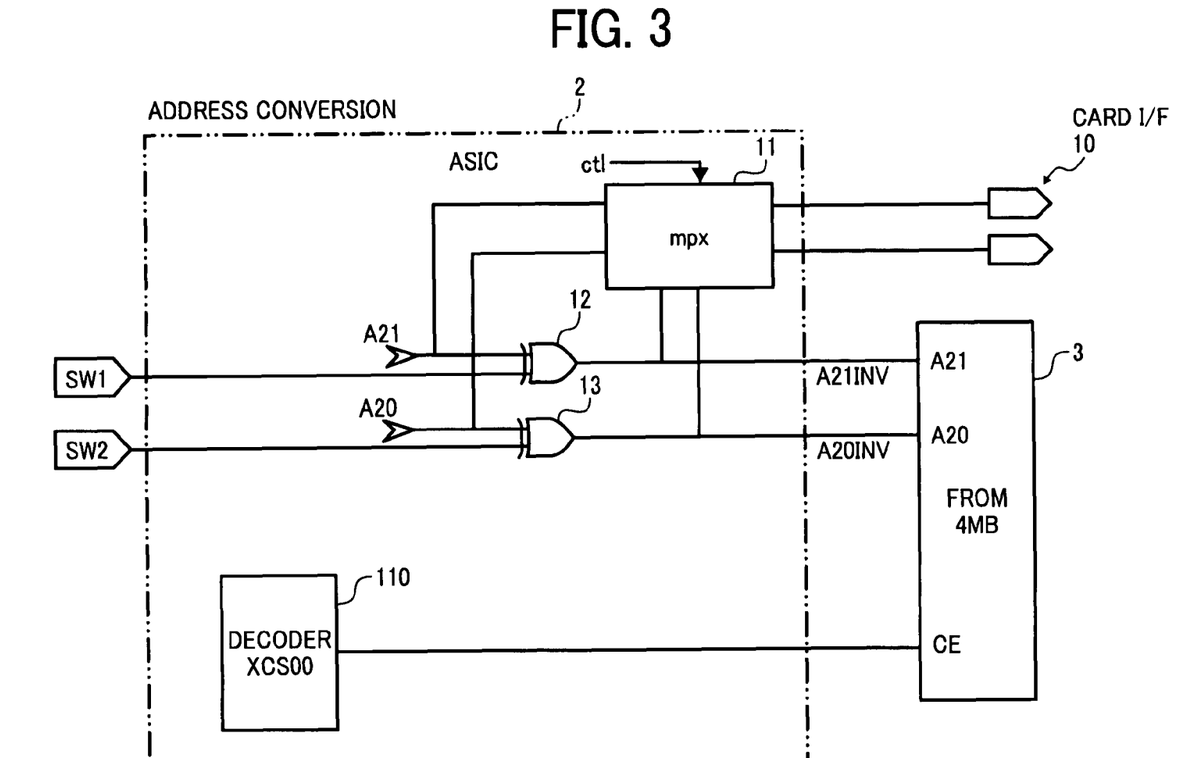
FIG. 3 is a block diagram of an address decoder of an ASIC shown in FIG. 2.

FIG. 3 is a drawing of a circuit of the address decoder in the ASIC 2 shown in FIG. 2. An exclusive OR gate 12 performs an exclusive OR operation on the highest-order bit (A21) of the address data generated by the CPU 1 and the one-bit controller identification data generated by the controller type determining switch sw1 and sends the output to the FROM 3 and a multiplexer 11. Another exclusive OR gate 13 performs an exclusive OR operation on the bit (A20) immediately below the highest-order bit A21 of the address data generated by the CPU 1 and the one-bit scanner identification data generated by the scanner type determining switch sw2 and sends the output to the FROM 3 and the multiplexer 11.

Figure 4:
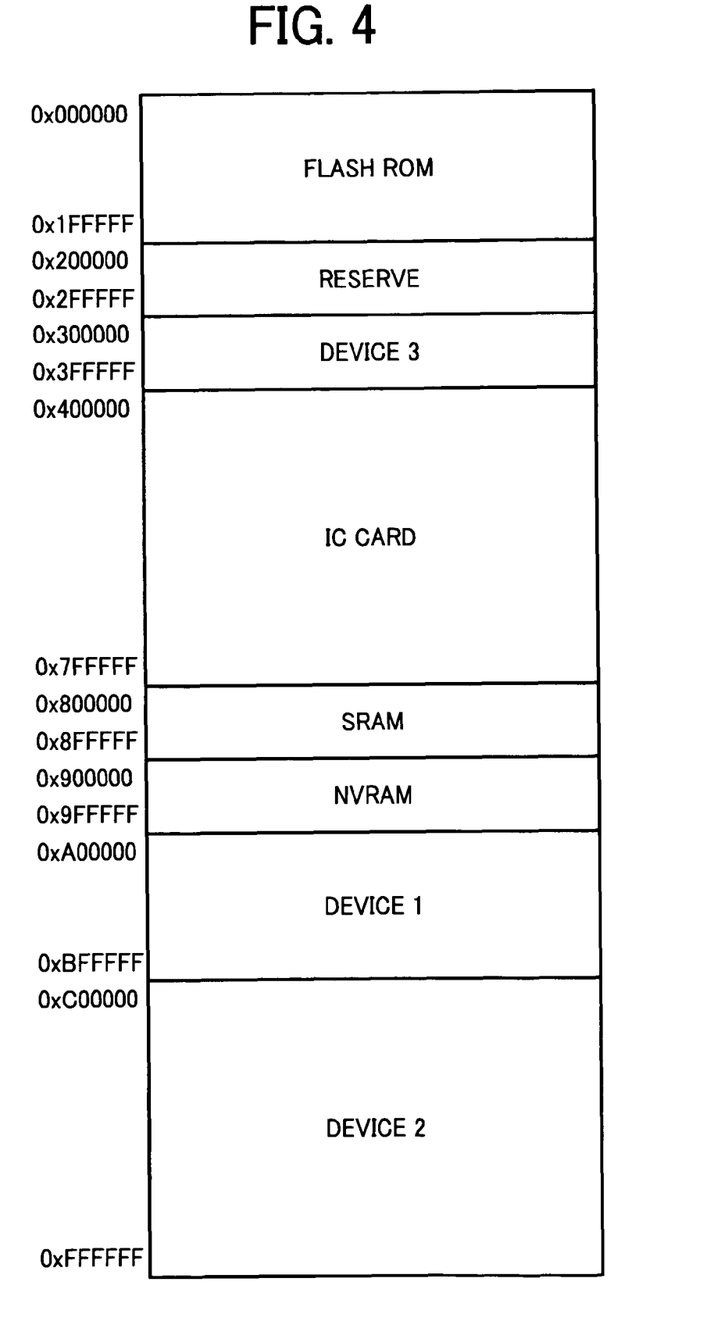
FIG. 4 is a plan view of an address map of addresses accessed by a CPU shown in FIG. 2, showing device allocation.

FIG. 4 is a drawing of an address map, that is, allocation of the address data generated by the CPU 1 to each of the devices. The address map includes an area to which addresses of the FROM 3 are allocated, an SRAM area, which serves as the work area, an NVRAM area for storing user data, and device areas for image processing, I/O control, etc. When an address allocated in the ASIC 2 of the address decoder is specified, a decoder 110 outputs a chip selection signal and the device corresponding to the specified address area becomes active.

Figure 5:
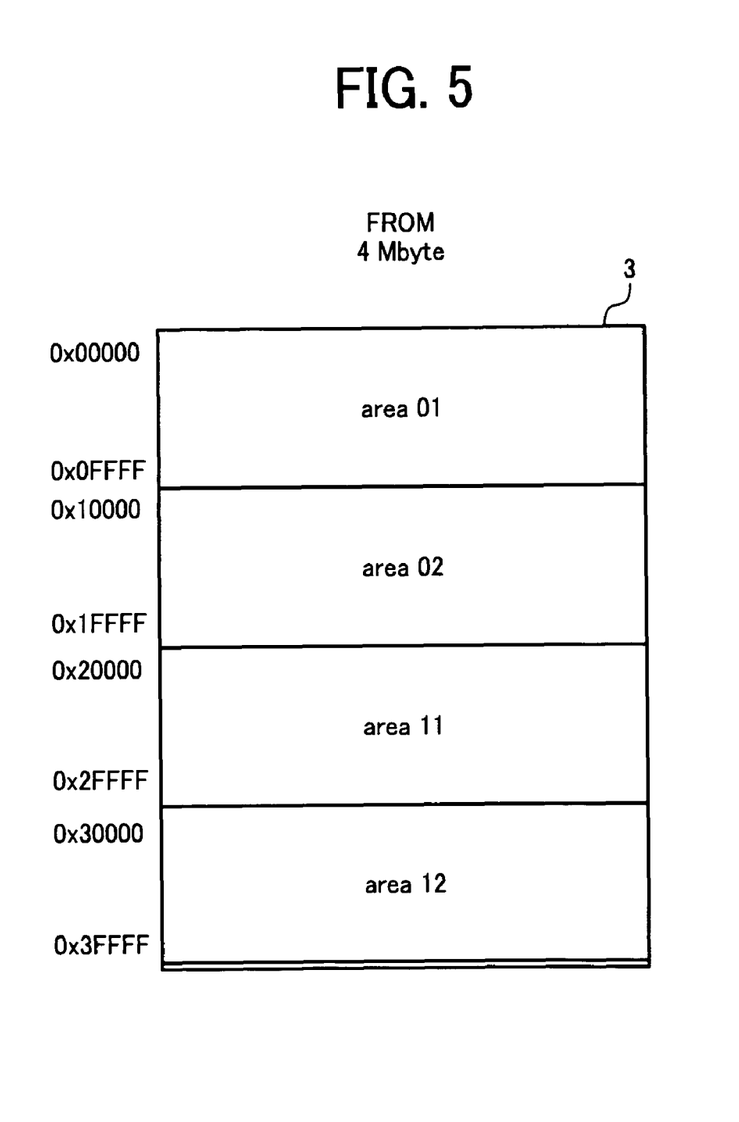
FIG. 5 is a drawing of the address map of address allocated to data storage area of the address accessed in a FROM by the CPU.

FIG. 5 is a drawing of the address map allocated to the FROM area (FROM 3 shown in FIG. 2) of 4 MB capacity, shown in FIG. 4.

If A21="0" when the controller identification data (which is "1" when high functionality system controller 104-1 is connected, and "0" when low functionality system controller 104-2 is connected) of the controller type determining switch sw1 shown in FIG. 3 is non-active, that is, "0" (that is, when the low functionality system controller 104-2 is connected), 0x00000 of the normal area of the FROM 3, represented by area 01 in FIG. 5, becomes the reset vector address. When the controller identification data changes to active, that is "1", the CPU 1 tries to access the reset vector address 0x00000. However, as an exclusive OR operation is performed on A21, the CPU 1 accesses the address 0x20000 (area 11) of the FROM 3. The area in the FROM 3 that is accessed is changed without any software performing controller identification. In other words, the CPU 1 at the engine 101 end runs two completely different programs (that co-exist), according to the type of the system controller 104 that is selected (104-1 or 104-2).

Further, by performing an exclusive OR operation on the scanner identification data of the scanner type determining switch sw2 (which is "1" when the color scanner 103-1 is connected, and "0" when the monochrome scanner 103-2 is connected) and the remaining bits (apart from the highest-order bit A21) A20, 0x10000 (area 02) can be taken as the reset vector address. Similarly, the 0x30000 (area 12) can be taken as the reset vector address in the case where the controller type determining switch sw1 and the scanner type determining switch sw2 are combined.

A case of insufficient FROM capacity is considered below, where the FROM area allocated in the address map is only 2 MB but data of 4 MB needs to be loaded to the FROM area. A maximum of 4 MB of ROM can be used by bank switching the 4 MB space of the FROM. However, when bank switching the 4 MB space, the highest-order address is fixed and the 4 MB is equally divided (that is, into two 2 MB). If the address map includes a reserve area of 1 MB as shown in FIG. 4, and it is assumed that the reserve area is allocated to the FROM area, the remaining 1 MB deficit can be made up by using 1 MB from the 2 MB block obtained from bank switching.

Similarly, in the case of address area allocated to the IC card that is connected to the IC card I/F 10, the area from which the program is loaded based on the exclusive OR operation will vary according to the model configuration, that is, the type of the system controller 104 in this case. In other words, the program that is executed will vary according to the type of the system controller 104. Consequently, low functionality program and high functionality program can co-exist on a single IC card and the access areas are hardware-determined, that is, by the model configuration (the type of the system controller 104), obviating the need for the controller type to be determined by software. The IC card has stored therein control programs associated with the types of the system controller 104 and the scanner 103. Consequently, each control program can be associated with the FROM area to which it is to be downloaded, and the relevant control program can be downloaded to the appropriate address (FROM area) in the FROM 3 without the intervention of software.

When downloading, such as reading, from the card area, again, software is not required for performing area identification. If areas are fixed by hardware, however, for uploading, such as writing, software has to perform address conversion for fixing areas for writing under normal conditions or according to which type of the system controller 104 or scanner 103 is connected. Therefore, the multiplexer 11 is provided, so that the CPU 1 can control the multiplexer 11 to disable the exclusive OR function on the card area during upload. In other words, during upload, the CPU 1 allocates the address data as it is to the IC card.

Figure 6:
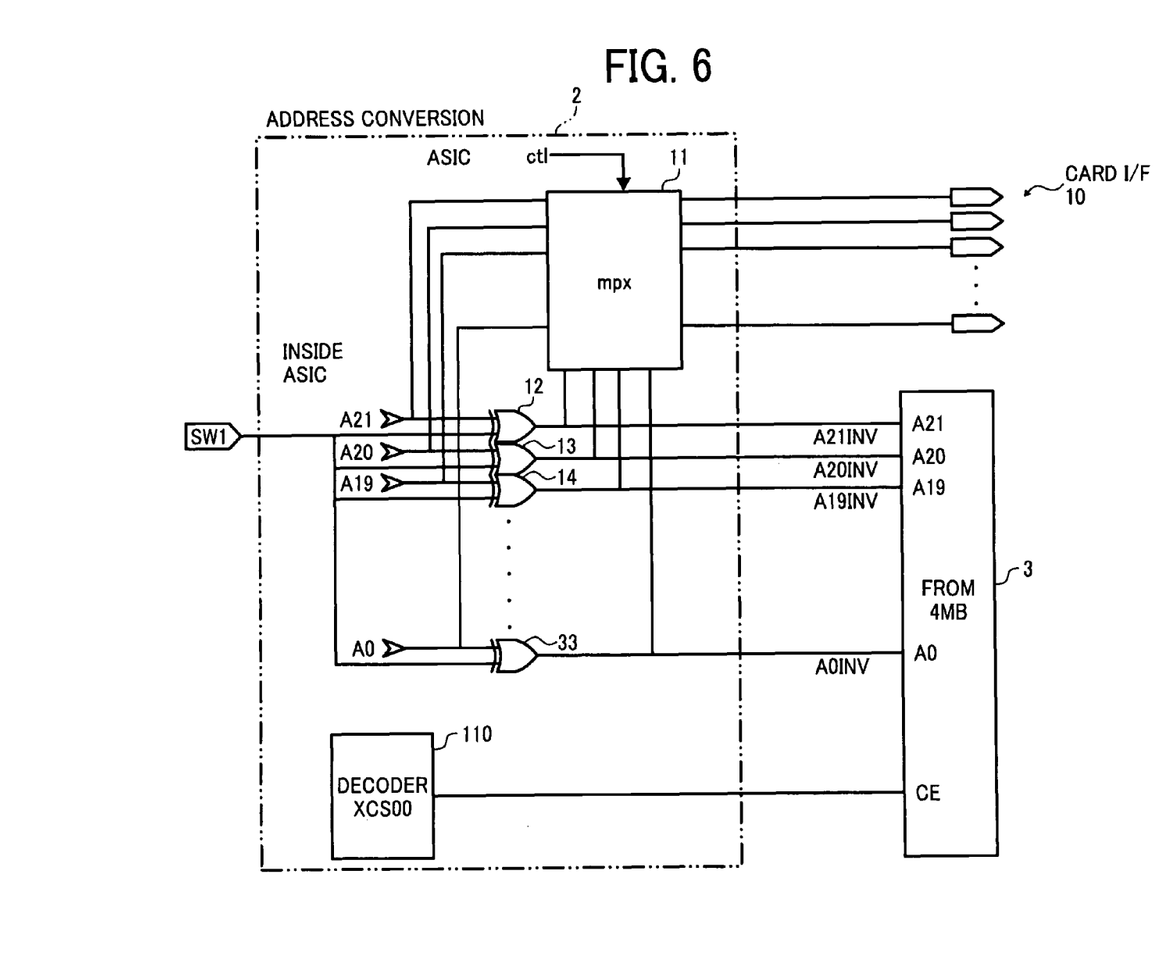
FIG. 6 is a block diagram of circuit elements of ASIC that are unique to the ASIC according to a second embodiment of the present invention.

In a second embodiment of the present invention, as shown in FIG. 6, the exclusive OR gate 12 performs an exclusive OR operation on the controller identification data of the system controller 104 and all the bits of the address data output by the CPU 1 and sends the output to the FROM 3 and the IC card. In other respects, the second embodiment is identical to the first embodiment. According to the configuration shown in FIG. 6, if A21="0" when the controller identification data (which is "1" when the high functionality system controller 104-1 is connected, and "0" when the low functionality system controller 104-2 is connected) of the controller type determining switch sw1 shown in FIG. 3 is non-active, that is, "0" (that is, when the low functionality system controller 104-2 is connected), 0x00000 of the normal area of the FROM 3 becomes the reset vector address. When the controller identification data changes to active, that is "1", the CPU 1 tries to access the reset vector address 0x00000. However, as an exclusive OR operation is performed on all the addresses, the CPU 1 accesses the address 0x3FFFF (area 22) of the FROM 3. Thus, contiguous addresses are allocated either from the highest-order address or from the lowest-order address of the program area, as the situation demands. Consequently, contiguous areas can be allotted as program areas, making it possible for low functionality and high functionality programs to co-exist in contiguous addresses in the FROM area without encroaching on each other. As a result, even if there is a shortfall in the capacity, it can be easily solved.

Similarly, in the case of the card area, the area from which the program is loaded based on the exclusive OR operation will vary according to the model configuration, that is, the type of the system controller 104 in this case. Thus, low functionality program and high functionality program can co-exist on a single IC card and the access areas are hardware-determined, that is, by the model configuration, obviating the need for the controller type to be determined by software. As the controller type serves as the determining factor for the access area, the destination FROM area to which program is to be downloaded can be determined by the card, enabling the program to be downloaded to the specific address (FROM area).

As described above, according to one aspect of the present invention, the reset vector address of the memory can be switched according to the unit (103) that is selected from among a plurality of units (103). Different control programs can co-exist in contiguous areas in the memory, improving the overall development rate of the image forming apparatus equipped with a variety of functionalities and avoiding the possibility of any failure due to co-existence of dichotomous programs. As area for the program is allocated by performing an exclusive OR operation, memory area need not be secured in the initial phase of development, accounting for considerable degree of freedom in allocating program volume and improved development rate.

Furthermore, according to another aspect of the present invention, the highest-order address bits in the memory are used for performing the exclusive OR operation. Consequently, the memory area can be divided into contiguous address areas. As a result, software development rate can be improved and failure related to program dichotomy can be avoided.

Moreover, according to still another aspect of the present invention, exclusive OR operations are performed on a plurality of specific bits to switch between the addresses output by the CPU. Consequently, the area can be subdivided under a plurality of conditions, enabling switching of the reset vector addresses of more number of programs. As a result, failure related to program dichotomy can be avoided.

Furthermore, according to still another aspect of the present invention, the program area can be divided into contiguous address areas. As a result, software development rate can be improved and failure related to program dichotomy can be avoided.

Moreover, according to still another aspect of the present invention, under one condition, program area can be secured contiguously from the smallest address, and under another condition program area can be secured contiguously from the largest address. Thus, the software can utilize the program area to the maximum irrespective of the hardware configuration. As a result, software development rate can be improved and failure related to program dichotomy can be avoided.

Furthermore, according to still another aspect of the present invention, as the reset vector address of the memory can be switched according to the unit (104) that is selected from among a plurality of units (104), different control programs can be stored on a single IC card. As area for the program is allocated by performing an exclusive OR operation, memory area need not be secured in the initial phase of development, accounting for considerable degree of freedom in allocating program volume and improved development rate.

Moreover, according to still another aspect of the present invention, the highest-order address bits in the memory are used for performing the exclusive OR operation. Consequently, the memory area of the IC card can be divided into contiguous address areas. As a result, software development rate can be improved.

Furthermore, according to still another aspect of the present invention, exclusive OR operations are performed on a plurality of specific bits to switch between the addresses output by the CPU. Consequently, the area can be subdivided under a plurality of conditions, enabling switching of the reset vector addresses of more number of programs.

Moreover, according to still another aspect of the present invention, the program area can be divided into contiguous address areas. As a result, software development rate can be improved.

Furthermore, according to still another aspect of the present invention, under one condition, program area can be secured contiguously from the smallest address, and under another condition program area can be secured contiguously from the largest address. Thus, the software can utilize the program area to the maximum irrespective of the hardware configuration. As a result, software development rate can be improved and failure related to program dichotomy can be avoided.

Moreover, according to still another aspect of the present invention, a selection output unit (11) controls whether the address accessed on the IC card is to be treated as address data accessed by the CPU or as exclusive OR data. Thus, address conversion need not be performed by software when uploading data to the IC card, and data can be uploaded in a predetermined format.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that includes a memory that stores therein a control program, a central processing unit that executes the control program stored in the memory, a print engine controlled by the central processing unit, and an additional unit that is selected from a plurality of external units, the image forming apparatus comprising:
   an identification signal generating unit to generate identification data indicating a type of the additional unit that is connected externally; and
   an exclusive OR unit to allocate an exclusive OR data of an address data for the central processing unit to access the memory and the identification data to the memory, wherein identification signal generating unit is
   a switch that is attached to a connector for connecting the additional unit to the print engine, and
   wherein the switch is configured to act on-off, when the additional unit is connected to the connector, to generate a one-bit signal as the identification data and to input the identification data to the exclusive OR unit directly.

2. The image forming apparatus according to claim 1, further including:
   a plurality of identification signal generating units configured to generate the identification data for each of the external units, and
   the exclusive OR unit is configured to perform an exclusive OR operation on a specific address bit of the address data and the identification data generated by each of the plurality of identification signal generating units.

3. The image forming apparatus according to claim 2, wherein the specific address bit includes a highest-order address bits and a subsequent lower-order address bit.

4. The image forming apparatus according to claim 1, wherein the exclusive OR unit is configured to perform an exclusive OR operation on all address bits of the address data and the identification data.

5. The image forming apparatus according to claim 1, further comprising:
   an integrated-circuit card interface configured to connect an integrated-circuit card that stores therein a download program, wherein
   the exclusive OR unit is configured to allocate the exclusive OR data of the address data for the central processing unit to access the integrated-circuit card and the identification data to the integrated-circuit card.

6. The image forming apparatus according to claim 5, wherein
   the identification signal generating unit is configured to generate one-bit identification data indicating the type of the unit that is connected externally, and
   the exclusive OR unit is configured to perform an exclusive OR operation on a highest-order address bit of the address data and the identification data.

7. The image forming apparatus according to claim 5, wherein
   a plurality of identification signal generating units are provided each configured to generate the identification data for each of the units, and
   the exclusive OR unit is configured to perform an exclusive OR operation on a specific address bit of the address data and the identification data generated by each of the identification signal generating units.

8. The image forming apparatus according to claim 7, wherein the specific address bit includes a highest-order address bits and a subsequent lower-order address bit.

9. The image forming apparatus according to claim 5, wherein the exclusive OR unit is configured to perform an exclusive OR operation on all address bits of the address data and the identification data.

10. The image forming apparatus according to claim 5, further comprising:
    a selection output unit to select one of the exclusive OR data and the address data, and output selected data to the integrated-circuit card.

11. The image forming apparatus according to claim 1, wherein the memory is a flash read only memory.

* * * * *